No. 742,438. PATENTED OCT. 27, 1903.
J. JACOBSON.
TUBULAR STALK FOR ARTIFICIAL FLOWERS AND PROCESS OF MAKING SAME.
APPLICATION FILED APR. 19, 1902.
NO MODEL. 2 SHEETS—SHEET 1.
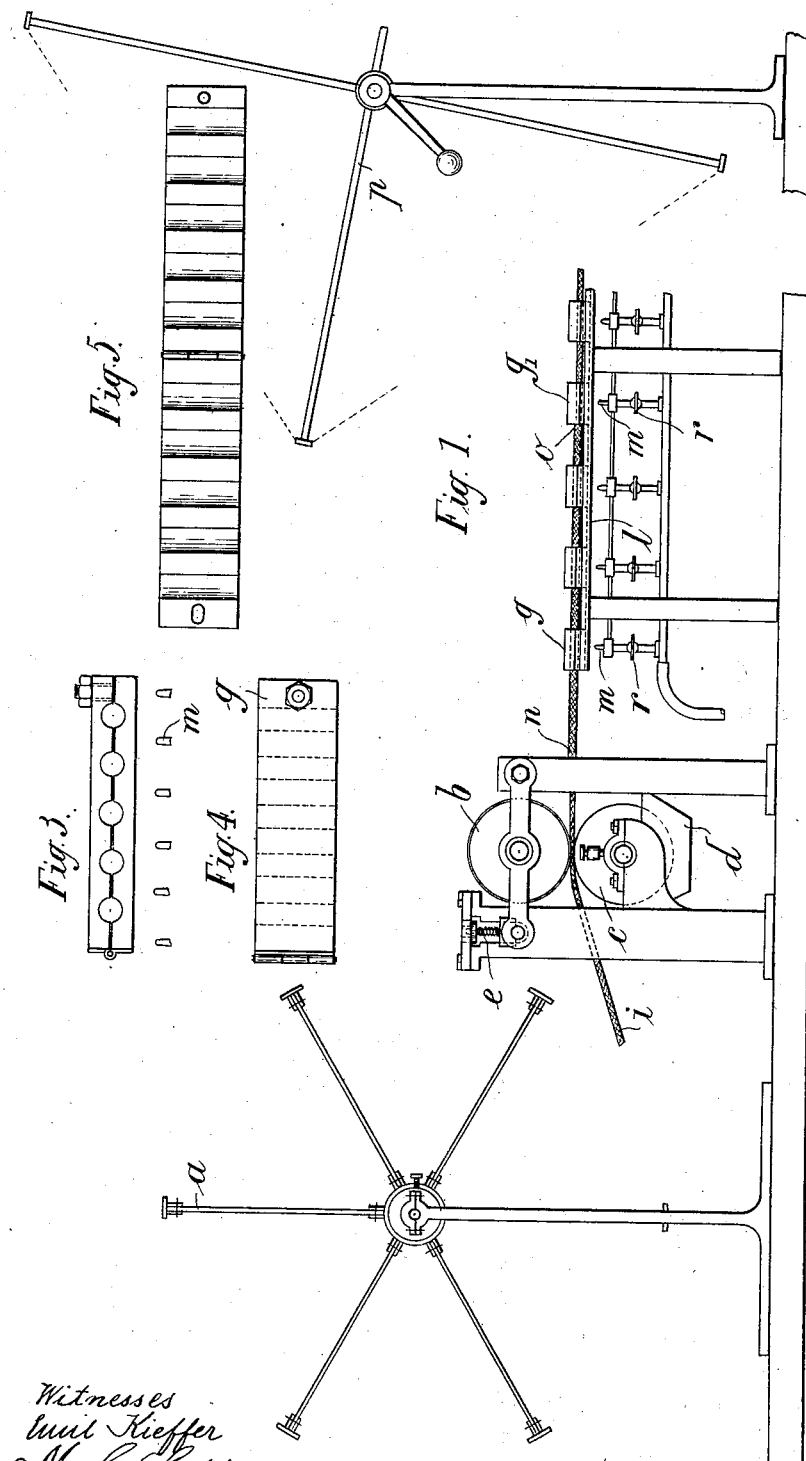
Witnesses
Emil Kieffer
M. C. Lyddane
Inventor
Julius Jacobson
by G. Dittman
Attorney

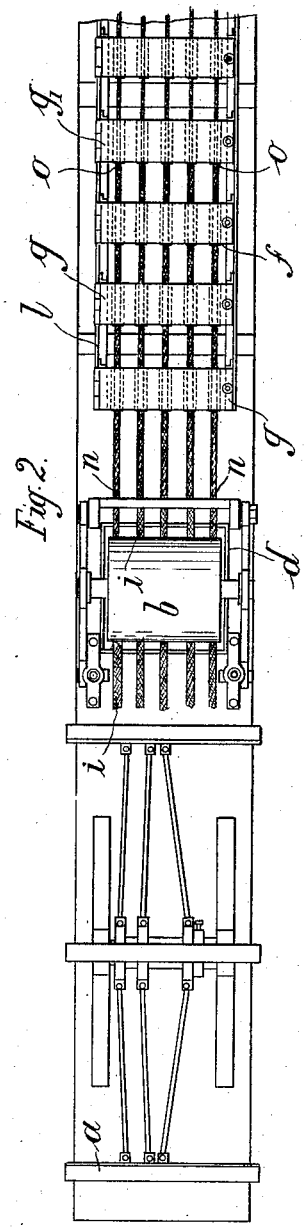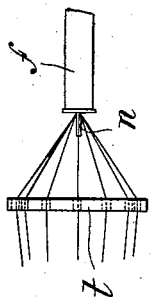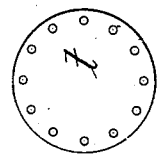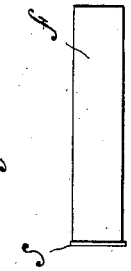

No. 742,438. Patented October 27, 1903.

UNITED STATES PATENT OFFICE.

JULIUS JACOBSON, OF WARSAW, RUSSIA.

TUBULAR STALK FOR ARTIFICIAL FLOWERS AND PROCESS OF MAKING SAME.

SPECIFICATION forming part of Letters Patent No. 742,438, dated October 27, 1903.

Application filed April 19, 1902. Serial No. 103,791. (No specimens.)

*To all whom it may concern:*

Be it known that I, JULIUS JACOBSON, a subject of the Emperor of Russia, and a resident of Warsaw, Russia, have invented certain new and useful Improvements in Tubular Stalks for Artificial Flowers and Processes of Making the Same, of which the following is a specification.

The present invention relates to the manu10 facture of new and improved stalks for artificial flowers.

The object of the invention is to provide an improved method of making tubes for stalks of fine twine composed, preferably, of fine silk or flax moistened with a suitable finishing fluid and passed through dies, as will be hereinafter described, and fully pointed out in the claims. Such tubes may be made of any desired shape in section, such as of tri20 angular or other polygonal form or circular, as may suit the maker. The arrangement of the twines in the tubes may be varied, after which the formed tubes are moistened with a viscous fluid, such as glue, and given their proper form by drawing through heated dies having suitable cores. By the action of the high temperature the twines previously moistened with the finishing liquid acquire the necessary stiffness and will permanently re30 tain the form imparted to them by the dies. In case the tubes are not woven, but simply glued together, the glue concretes on the tubes in passing through the dies, and thus fastens the twines. The glue used for this purpose must not crumble in drying and must, moreover, possess a certain amount of elasticity, which qualities are obtainable by appropriate combination of its constituents.

One of the possible mechanisms for pro40 ducing tubes woven of twine is shown on Figures 1 and 2 of the drawings, which represent, respectively, a side elevation of the device embodying my invention and a plan thereof. The other figures represent, respectively, Fig. 3, a front view of the die-frame in closed position and the disposition of the heating burners; Fig. 4, a plan view thereof; Fig. 5, the die-frame of Figs. 3 and 4 in opened position; Fig. 6, a side view of a die with a lon50 gitudinal canal of square section; Fig. 6$^a$, an end view thereof; Fig. 7, a side view of a die with a longitudinal canal of hexagonal section; Fig. 7$^a$, an end view thereof, and Fig. 8 a detail of a device for the manufacture of glued tubular stalks of straight twines.

For the manufacture of the woven tubes I use, preferably, braiding or plaiting machines for round lace; but in the present instance finer sorts of twines are used, which results in a tubularly-woven hollow tape, soft and flattened in rough state, being obtained. For the manufacture of the tube for stalks the machines must be of such size as to produce, on sufficiently fine twines being used, tapes from one-half to four or five millimeters wide.

In Fig. 1 is shown a reel $a$, which receives the tapes direct from the machines mentioned and delivers them over to the device by which they are formed further. This device in the construction shown consists of a pair of adjacent rollers $b$ and $c$, whereof the roller $b$ is coated with rubber, while the roller $c$, made of brass, is finely grooved on the surface and has its lower portion immersed in a trough $d$, filled with finishing liquid. The pressure of the rollers is elastically regulated by the screw and spring $e$ or in any other suitable manner. The rollers are revolved through gearing by power or by clockwork with definite peripheral speed, which must correspond with the speed of advancement of the tape through the dies. The number of the tapes $i$ supplied by the rollers corresponds with the number of dies carried by one frame, but is optional otherwise. In the drawings, Fig. 2, five tapes are shown by way of example. From between the rollers the tapes enter into longitudinal canals $k$ in a whole range of dies $f$, located in successively-placed frames $g$. Through the dies the tapes are drawn by a manually-operated reel $p$, Fig. 1, right-hand side, upon which they are wound on leaving the dies. The range of the frames $g$ with the dies is fixed in a suitable brace $l$. Each frame is heated by a series of burners $m$, disposed in the manner shown on Figs. 1 and 3 or in any other suitable manner productive of uniform heat. Into each tape as it advances between the rollers is inserted a wire $n$, preferably a steel wire, whose section is identical with that of the canals in the dies used. The cross-section of the wire, however, is so much smaller than the cross-section of the canals in the foremost range of the dies as to allow of the wire, together with the tape, being inserted into said canals, leaving between the wire and the inner furface of the canals a free space not exceeding the thickness of the tube being produced. The wire $n$ passes, with the tape, through only a few of the foremost dies with sufficiently wide canals $k$—in the present instance, as shown on the drawings, through the first three frames. It ends at $o$ at the entrance into a die of the next frame $g'$, where it stops without being carried farther on by the advancing movement of the tube being produced, as the dies of the frame $g'$ and of all the subsequent frames (on the right-hand side of the drawings) have canals with sections narrower than the section of the wire.

The burners $m$ are provided with controlling-cocks $r$, by means of which the flames are regulated in such a manner that the temperature of the frames gradually decreases in the direction of the advancing of the tapes. In the above-described disposition of the mechanism the tapes acquire the tubular form of the desired section on passing through three foremost frames $g$, the subsequent frames $g'$ carrying dies with narrower canals, imparting permanency to this form by pressing more firmly the walls of the tube and by ultimately drying the same.

The dies $f$ ought not in practice to be made longer than their actual size shown on Figs. 6 and 7 for two reasons. In the first place, the manufacture of precisely-uniform canals in longer dies would offer considerable difficulties, and, in the second place, in the passage of the tubes through heated dies gases of evaporation are generated which must be allowed to freely escape from the interior of the dies. The frames $g$ can also be made to carry several ranges of dies; but in this latter instance the frames should be provided with communicating air-valves through each range of dies for the free escape of the evaporation-gases. The tubes thus obtained are so stiff and resistant that the longitudinal strain they sustain through the action of the reel $p$ is incapable of producing upon them any deforming effect.

An exemplary construction of a folding frame to receive and hold the dies is shown on Figs. 3, 4, and 5. The dies may be provided with rim-flanges $s$, Figs. 6 and 7, to fix them firmly within the frames and to prevent their displacement by the tapes when moving.

It is obvious that besides the machine for the manufacture of rough woven tubes referred to machines of any other type which would produce tubes with longitudinal, transversal, or any other disposition of twines may be used. In Fig. 8 is shown a modification to be used in the manufacture of tubes of separate (not woven) twines. Rough twines in number and of thickness corresponding with the size of the tubes to be produced are moistened with appropriately-prepared glue and passed singly through guiding-apertures in a disk $t$, whence they are brought together to surround the wire $n$ at the entrance into the die, as shown in the drawings. In passing through the die they are by the high temperature of the die glued together into a tube. This latter process is more simple and much cheaper; but the tubes obtained in this manner are necessarily less durable than with the preceding process.

The dyeing of the tubes can be done before or after they have been formed, dependent on the dies used. To make the stalks of such tubes, it is sufficient to insert a proper wire into each of them, which is an important improvement in the manufacture of artificial flowers, the exact gluing of the tissue over the wire in the old method being troublesome and expensive.

Having thus fully described my invention, what I claim as new, and desire to secure by Letters Patent of the United States, is—

1. The process herein described for making tubes for stalks for artificial flowers, which consists in moistening twine with a finishing liquid and afterward passing it in tubular form upon cores of wire through heated dies.

2. The process herein described for the manufacture of tubes for artificial-flower stalks which consists in moistening twine with a finishing fluid, assembling the twine into tubular form and passing it in this form, while moistened, through heated dies.

3. The process herein described for the manufacture of tubes for artificial-flower stalks, which consists in moistening twine with a finishing fluid, assembling the twine into tubular form and passing it in this form, while moistened through heated dies upon wire cores, and afterward through heated dies without cores.

4. A tube for the cover of a stalk consisting of twines disposed longitudinally in tubular form and held in shape by a viscous fluid artificially dried thereon, substantially as described.

In testimony whereof I have affixed my signature in presence of two witnesses.

JULIUS JACOBSON.

Witnesses:
 STANISLAUS PROSHOCSYK,
 M. HORODYISKA.